United States Patent
Beck et al.

(10) Patent No.: US 8,224,006 B2
(45) Date of Patent: Jul. 17, 2012

(54) HEARING AID DEVICE AND A METHOD OF MANUFACTURING A HEARING AID DEVICE

(75) Inventors: Frank Beck, Spardorf (DE); James Edward De Finis, Flanders, NJ (US); Jens-Christian Holst, Berlin (DE); Harald Klemenz, Fürth (DE); Lavlesh Lamba, Piscataway, NJ (US); Pei Chyi Kristy Lim, Singapore (SG); Uwe Rass, Nürnberg (DE); Joseph Sauer, Strullendorf (DE); Amit Vaze, Parlin, NJ (US)

(73) Assignee: Siemens Medical Instruments Pte. Ltd., Singapore (SG)

( * ) Notice: Subject to any disclaimer, the term of this patent is extended or adjusted under 35 U.S.C. 154(b) by 354 days.

(21) Appl. No.: 12/549,450

(22) Filed: Aug. 28, 2009

(65) Prior Publication Data
US 2011/0051965 A1    Mar. 3, 2011

(51) Int. Cl.
*H04R 25/00* (2006.01)
*H04R 31/00* (2006.01)

(52) U.S. Cl. .......................... 381/322; 29/594

(58) Field of Classification Search .................. 381/322, 381/324, 369, 328, 312, 330, 68; 600/431; 361/818
See application file for complete search history.

(56) References Cited

U.S. PATENT DOCUMENTS

| | | | |
|---|---|---|---|
| 4,783,815 A * | 11/1988 | Buttner | 381/324 |
| 6,546,109 B1 * | 4/2003 | Gnecco et al. | 381/322 |
| 6,768,654 B2 * | 7/2004 | Arnold et al. | 361/818 |
| 6,843,690 B2 | 1/2005 | Sauer et al. | |
| 2006/0177083 A1 * | 8/2006 | Sjursen et al. | 381/322 |
| 2007/0055147 A1 * | 3/2007 | Dalzell et al. | 600/431 |
| 2007/0086610 A1 * | 4/2007 | Niederdrank | 381/312 |
| 2008/0257201 A1 | 10/2008 | Harris et al. | |

FOREIGN PATENT DOCUMENTS

| | | |
|---|---|---|
| DE | 3639402 A1 | 5/1988 |
| DE | 102007042590 A1 | 3/2009 |
| EP | 1317163 A2 | 6/2003 |
| EP | 1465457 A2 | 10/2004 |

* cited by examiner

*Primary Examiner* — Davetta W Goins
*Assistant Examiner* — Phan Le

(57) ABSTRACT

The invention relates to a hearing aid device and a method of manufacturing the hearing aid device. The hearing aid device comprises a housing and a first conductive layer. The housing further comprises a first non-conductive layer and a second non-conductive layer. The first conductive layer is between the first non-conductive layer and the second non-conductive layer.

8 Claims, 11 Drawing Sheets

HEARING AID DEVICE AND A METHOD OF MANUFACTURING A HEARING AID DEVICE

FIELD OF THE INVENTION

The present invention relates to a hearing aid device and a method for manufacturing the hearing aid device.

BACKGROUND OF THE INVENTION

Hearing aid devices and hearing devices generally comprise a housing, in which a microphone, an amplifier or amplifying device, a receiver, a power supply, mostly a zinc-air battery inter alia are arranged. The receiver is connected to an acoustic output of the housing, which emits the acoustic signals generated and prepared by the hearing aid device into an auditory canal of a wearer of the hearing aid device.

In order to meet the aesthetic requirements of a wearer of the hearing aid device, this is to be as minimally externally visible on the wearer as possible. These requirements are particularly high especially in the case of hearing devices worn in the ear, referred to as in-ear hearing aid device. The components needed for an in-ear hearing aid device are thus to be designed as small as possible within the in-ear hearing aid device, to be packed as tightly as possible and to be reduced to a minimum.

Additionally, the components of the hearing aid device are to be shielded from external interferences for efficient functioning of the hearing aid device. Compensating elements such as coils, capacitors or certain topology of conductive lines and cables may be arranged within the inner space of a housing of the hearing aid device to reduce the electromagnetic interferences (EMI) within the housing. Alternatively, a shielding layer, such as having a gold plated layer on the inner surface of the hearing aid device may reduce the EMI within the housing of the hearing aid device. However, the use of compensating elements and the shielding layer may provide limitations on the miniaturization of the hearing aid device. Further, the manufacturing time of the hearing aid device is increased as the compensating elements are to be carefully positioned into the hearing aid device or the gold plated layer is to be provided onto the inner surface of the housing after the after has been made.

SUMMARY OF THE INVENTION

It is an object of the invention to provide shielding of components from external electromagnetic interferences.

The above object is achieved by a hearing aid device and a method of manufacturing the hearing aid device, wherein the hearing aid device comprises a housing having a first non-conductive layer and a second non-conductive layer, and a first conductive layer between the first non-conductive layer and the second non-conductive layer.

The first conductive layer embedded in between the first non-conducive layer and the second non-conducive layer of the housing of the hearing aid device shields an inner space of the housing from external electromagnetic interferences. The inner space of the housing accommodates the electrical components therein. Further this facilitates further miniaturization of the hearing aid device as the inner space of the housing may be used more efficiently and thus the hearing aid device can be more compact.

According to another embodiment, the hearing aid device further comprises a second conductive layer attached onto at least a portion of the inner surface of the second non-conductive layer. The second conductive layer attached onto the inner surface of the second non-conductive layer of the housing of the hearing aid device enables in miniaturization of the hearing aid device. Additionally, the requirement of loose wires leads may be reduced and thus the electromagnetic interference within the housing of the hearing aid device is reduced.

According to yet another embodiment, the second conductive layer is conductively connected to an electrical component. Connecting an electrical component to the second conductive layer enables miniaturization of the hearing aid device and eliminates the requirement of loose wire leads.

According to yet another embodiment, the electrical component includes a printed electrical component. Printed electrical components occupy less space and can easily be printed during the manufacturing of the housing. Thus, printed electrical components enable in miniaturization of the hearing aid device and also reduce the manufacturing time of the hearing aid device.

According to yet another embodiment, the first conductive layer and the second conductive layer are fabricated using a solid freeform fabrication technique selected from the group consisting of inkjet printing, pneumatic spraying, screen printing, pad printing, laser printing, dot matrix printing, thermal printing, lithography, and 3D printing. Fabricating or printing the first and the second conductive layer using a solid freeform fabrication technique enables in fabricating the first conductive layer between the first non-conducive layer and the second non-conductive layer and the second conductive onto the inner surface of the second non-conductive layer of the housing at the time of the manufacturing of the housing.

According to yet another embodiment, the first conductive layer and the second conductive layer comprises an element from the group consisting of copper, gold, silver and electrically conductive polymer. These elements comprise enhanced conductive properties and therefore enable the first conductive layer and the second conductive layer to have good electrical conductance.

According to yet another embodiment, the housing further comprises a third non-conductive layer arranged outwardly to the first non-conductive layer. Providing the third non-conductive layer enables providing additional features to the hearing aid device.

According to yet another embodiment, the hearing aid device further comprises a coil between the third non-conductive layer and the first non-conductive layer. The coil enables wireless communication with the hearing aid device. Additionally, the coil enables wireless charging of the hearing aid device. This enables efficient use of the inner space of the hearing aid device, and thus, enables miniaturization of the hearing aid device. Additionally, as the coil is provided external to the first conductive layer, the inner space is shielded from any EMI arising out of the coil by the first conductive layer.

Another embodiment includes a method of manufacturing a hearing aid device, wherein the method comprises embedding a first conductive layer between a first non-conductive layer and a second non-conductive layer of a housing of the hearing aid device.

Embedding the first conductive layer between the first non-conductive layer and the second non-conductive layer of the housing provides shielding of the inner space of the housing from EMI interferences. Further this facilitates further miniaturization of the hearing aid device as the inner space of the housing may be used more efficiently and thus the hearing aid device can be more compact.

According to yet another embodiment, the embedding includes fabricating the first conductive layer between the first non-conductive layer and the second non-conductive layer using a solid freeform technique selected from the group consisting of inkjet printing, pneumatic spraying, screen printing, pad printing, laser printing, dot matrix printing, thermal printing, lithography, and 3D printing.

According to another embodiment, the method further comprises attaching a second conductive layer onto an inner surface of the second non-conductive layer. The second conductive layer attached onto the inner surface of the second non-conductive layer of the housing of the hearing aid device enables in miniaturization of the hearing aid device. Additionally, the requirement of loose wires leads may be reduced and thus the electromagnetic interference within the housing of the hearing aid device is reduced.

According to yet another embodiment, the second conductive layer is conductively connected to an electrical component.

According to yet another embodiment, wherein the electrical component includes a printed electrical component.

According to yet another embodiment, the method comprises embedding a coil between the first non-conductive layer and a third non-conductive layer, the third non-conductive layer arranged outwardly to the first non-conductive layer.

According to yet another embodiment, wherein the first conductive layer, the second conductive layer and the coil comprises an element from the group consisting of copper, silver, gold and electrically conductive polymer.

BRIEF DESCRIPTION OF THE DRAWINGS

The present invention is further described hereinafter with reference to illustrated embodiments shown in the accompanying drawings, in which.

DETAILED DESCRIPTION OF THE INVENTION

Figure 1:
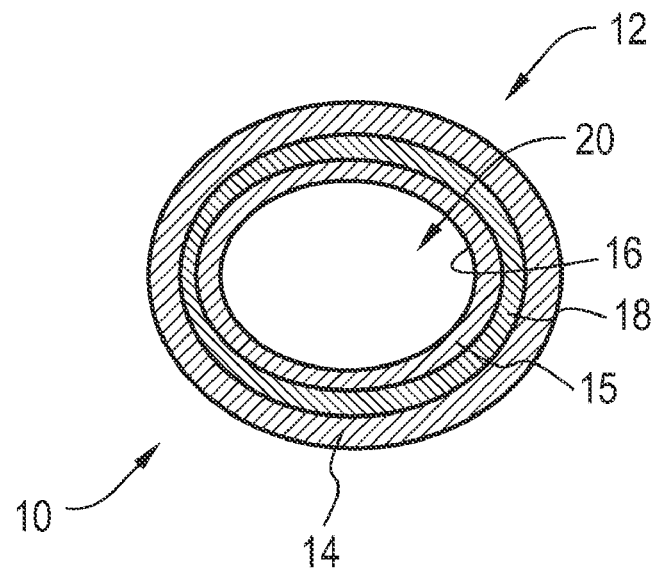
FIG. 1 illustrates a cross sectional view of a housing of a hearing aid device according to an embodiment herein.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1, illustrates a cross sectional view of a housing 10 of a hearing aid device 12 according to an embodiment herein. The housing 10 comprises a conductive layer 18 between a first non-conductive layer 14 and a second non-conductive layer 15. The conductive layer 18 with the first non-conductive layer 14 and the second non-conductive layer 15 fauns the wall of the housing 10. The conductive layer 18 provides shielding of an inner space 20 within the housing 10 from electromagnetic interference (EMI).

The hearing aid device 12 includes, but not limited to, in-ear hearing aid device, baby worn hearing aid device, behind the ear (BTE) hearing aid device, receiver in the canal (RIC) or ear hearing aid device, in the canal (ITC) hearing aid device, mini canal (MIC) hearing aid device, completely in the canal (CIC) hearing aid device, extended wear hearing aid device, open fit hearing aid devices, eye glass hearing aid devices and the like.

Still referring to FIG. 1, advantageously, the first non-conductive layer 14 and the second non-conductive layer 15 are manufactured using non-conductive materials, for example a resin, an adhesive, a paint or a synthetic material, such that the first non-conductive layer 14 and the second non-conductive layer 15 do not exhibit any electrical conductance property. The conductive layer 18 is manufactured using conductive materials such that the conductive layer 18 is electrically conductive.

Preferably, the conductive layer 18 extends substantially at the interior of the housing 10 between the first non-conductive layer 14 and the second non-conductive layer 15. This provides efficient shielding of the inner space 20. In an implementation, the conductive layer 18 can be a thin foil. Advantageously, the conductive layer 18 may be embedded between the first conductive layer 14 and the second conductive layer 15 during the manufacturing of the housing 10. Alternatively, the housing 10 may be manufactured such that the housing 10 comprises only the conductive layer 18 and the second non-conductive layer 15. However, it may not be preferred to manufacture the housing 10 such that it comprises only the conductive layer 18 and the second non-conductive layer 15, as it may cause inconvenience to the user of the hearing aid device 12 because of the hardness of the conductive layer 18. The housing 10 having the conductive layer 18 between the first non-conductive layer 14 and the second conductive layer 15 shields the inner space 20 from EMI. Providing the conductive layer 18 between the first non-conductive layer 14 and the second non-conductive layer 15 enables efficient usage of the inner space 20 of the housing 10.

Advantageously, the conductive layer 18 may be provided such that the conductive layer 18 encircles a substantial surface area of the second non-conductive layer 15. However, the conductive layer 18 may be provided such that it encircles only a particular region or portion of interest of the second non-conductive layer 15.

Figure 2:
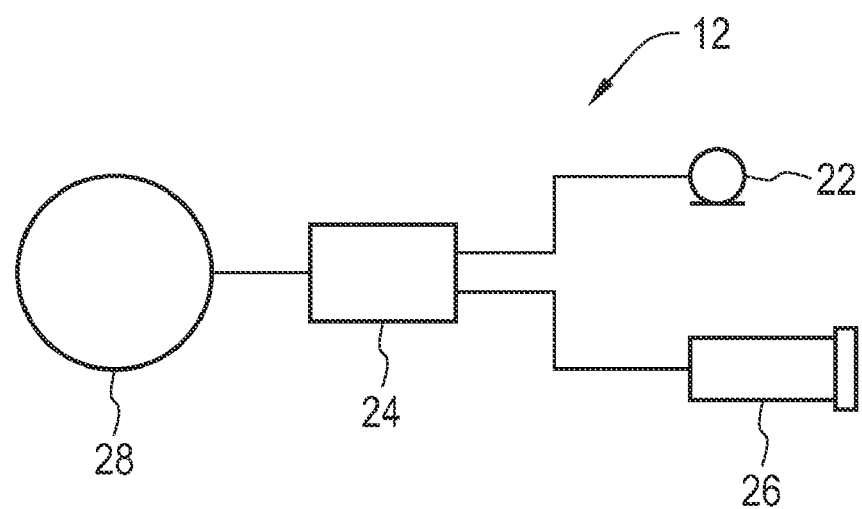
FIG. 2 illustrates a schematic block diagram of electrical components essential for a hearing aid function.

FIG. 2 illustrates a schematic block diagram of electrical components essential for a hearing aid function. The hearing aid device 12 comprises therein the electrical components essential for the hearing aid function, such as, a microphone 22, an amplifier 24, a receiver 26 and a power source 28. The electrical component may also include resistors, capacitors, coils and the like. The electrical components such as the resistor, capacitor or the coil may also be printed using solid freeform fabrication techniques, such as a 3D printing technique. The hearing aid device 1 records ambient noise with the aid of the microphone 22, amplifies these by means of the amplifier 24 and forwards them to the receiver 26. The power supply required for the amplifier 24 for amplification is provided by the power source 28. The sound signals from the receiver 26 are conveyed to the ear drum of the wearer by means of an outlet canal, tube or wire.

Referring now to FIG. 1 and FIG. 2, the electrical components are typically arranged in the inner space 20 of the housing 10. In an aspect, the conductive layer 18 shields the inner space 20 within the housing 10 from EMI. This shields the electrical components arranged within the inner space 20 from EMI.

Figure 3:
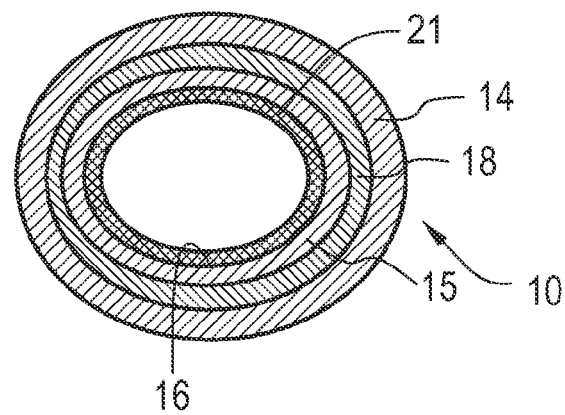
FIG. 3 illustrates a cross sectional view of housing comprising an additional conductive layer according to an embodiment herein.

FIG. 3 illustrates a cross sectional view of housing 10 comprising an additional conductive layer according to an embodiment herein. The housing 10 of the hearing aid device 12 comprises therein the electrical components essential for the functioning of the hearing aid device 12. In the shown example of FIG. 3, the housing 10 comprises the conductive layer 18 between the first non-conductive layer 14 and the second non-conductive layer 15. In an aspect herein, an additional conductive layer 21 may be attached onto the inner surface 16 of the second non-conductive layer 15 of the housing 10.

The conductive layer 21 is attached onto the inner surface 16 of the second non-conductive layer 15 of the housing 10 as the second non-conductive layer 15 is manufactured using a non-conductive material. The inner surface 16 of the second non-conductive layer 15 acts as a support for the conductive layer 21.

In the shown example of FIG. 3, the additional conductive layer 21 may represent a positive contact or a negative contact. However, multiple conductive layers may be attached onto the inner surface 16 of the second non-conductive layer 15. For example, if two conductive layers are attached the conductive layers may represent a positive and a negative contact. If multiple conductive layers are attached onto the inner surface 16 of the second non-conductive layer 15, the conductive layers would have to be separated using an insulating medium.

Figure 4A:
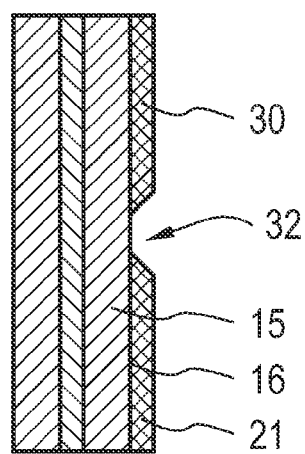
FIG. 4a illustrates one example where two conductive layers are separated by an insulating medium to form a positive and a negative contact.
Figure 4B:
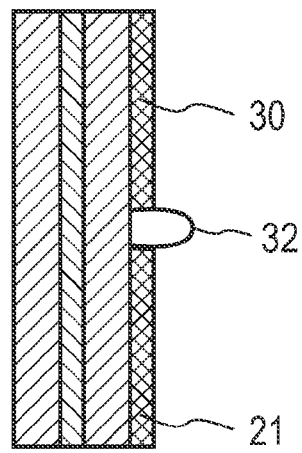
FIG. 4b illustrates an insulating medium provided to act as a barrier between two additional conductive layers

FIG. 4a illustrates one example where two conductive layers 21, 30 are separated by an insulating medium 32 to form a positive and a negative contact. The insulating medium 32 may be a non-conducting layer of the inner surface 16 of the second non-conductive layer 15 or an insulating layer attached between the conductive layers 21, 30. In certain embodiments, the insulating medium 32 may be an insulating layer such that the insulating layer acts as a barrier between the two additional conductive layers 21, 30 as illustrated in FIG. 4b.

Figure 5:
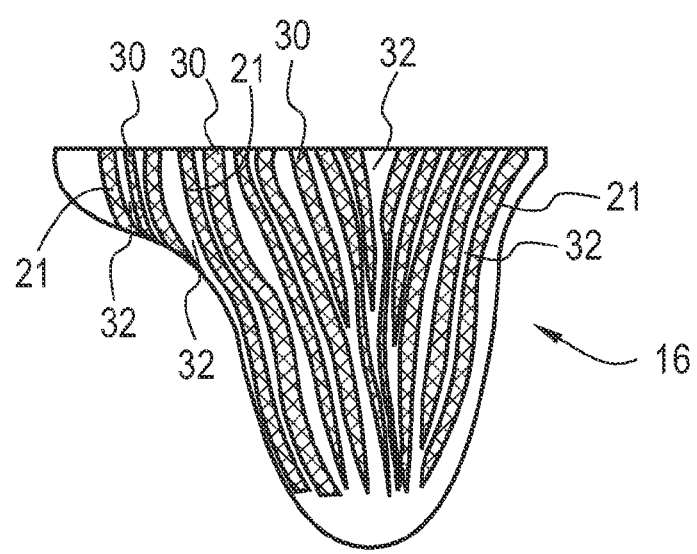
FIG. 5 illustrates a pattern of attaching additional conductive layers on an inner surface of a second non-conductive layer of a housing of a hearing aid device according to an embodiment herein.

FIG. 5 illustrates a pattern of attaching additional conductive layers on the inner surface of second non-conductive layer the housing of the hearing aid device according to an embodiment herein. In the shown example of FIG. 5, a plurality of additional conductive layers 21, 30 are attached on the inner surface 16 of FIG. 3 of the second non-conducive layer 15 of FIG. 3 in a stripe pattern. For example, one of the additional conductive layers may represent a positive contact and the other may represent a negative contact. For example, the additional conductive layers 21 may represent a positive contact and the additional conductive layers 30 may represent a negative contact. The additional conductive layers 21 are separated from the additional conductive layers 30 by an insulating medium 32. The insulating medium 32 in the present embodiment is portions of the inner surface 16 of the second non-conducive layer 15 onto which no conductive layers 21, 30 are attached.

Figure 6:
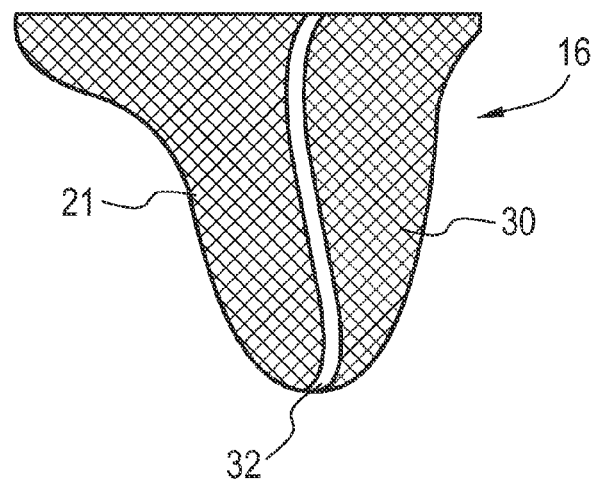
FIG. 6 illustrates another pattern of attaching additional conductive layers on an inner surface of a second non-conductive layer of a housing of a hearing aid device according to an embodiment herein.

FIG. 6 illustrates another pattern of attaching additional conductive layers on the inner surface of the housing of the hearing aid device according to an embodiment herein. In the shown example of FIG. 5, the additional conductive layer 21 is attached on one half of the inner surface 16 of FIG. 3 of the second non-conductive layer 15 of FIG. 3 and the conductive layer 30 is attached onto the other half of the inner surface 16 of the second non-conductive layer 15. The conductive layer 21 is separated from the conductive layer 30 by an insulating medium 32. The insulating medium 32 in the present embodiment is portion of the inner surface 16 of the second non-conductive layer 15 onto which no conductive layers 21, 30 are attached.

Attaching multiple conductive layers enable, conductively connecting multiple conductive layers to the electrical components. This enables in increasing the fault tolerance of the hearing aid device 1 as redundant connections to the electrical components can be made.

In the shown example of FIG. 3, the additional conductive layer 21 extends over a substantial surface area of the inner surface 16 of the second non-conductive layer 15. However, the additional conductive layer 21 may be attached onto only a portion of the inner surface 16 of the second non-conductive layer 21. If the additional conductive layer 21 is attached onto only a portion of the inner surface 16 of the second non-conductive layer 15, it may be required that the additional conductive layer 21 is to be attached onto the inner surface 16 of the second non-conductive layer 15 such that the position of the additional conductive layer 21 is suitable for making connections with electrical components. If a single additional conductive layer is attached onto the inner surface 16 of the second non-conductive layer 15, the additional conductive layer may extend over a substantial area of the inner surface 16 of the second non-conductive layer 15. However, the additional conductive layer can also extend over a portion or region of the surface of the inner surface 16 of the second non-conductive layer 15.

Figure 7:
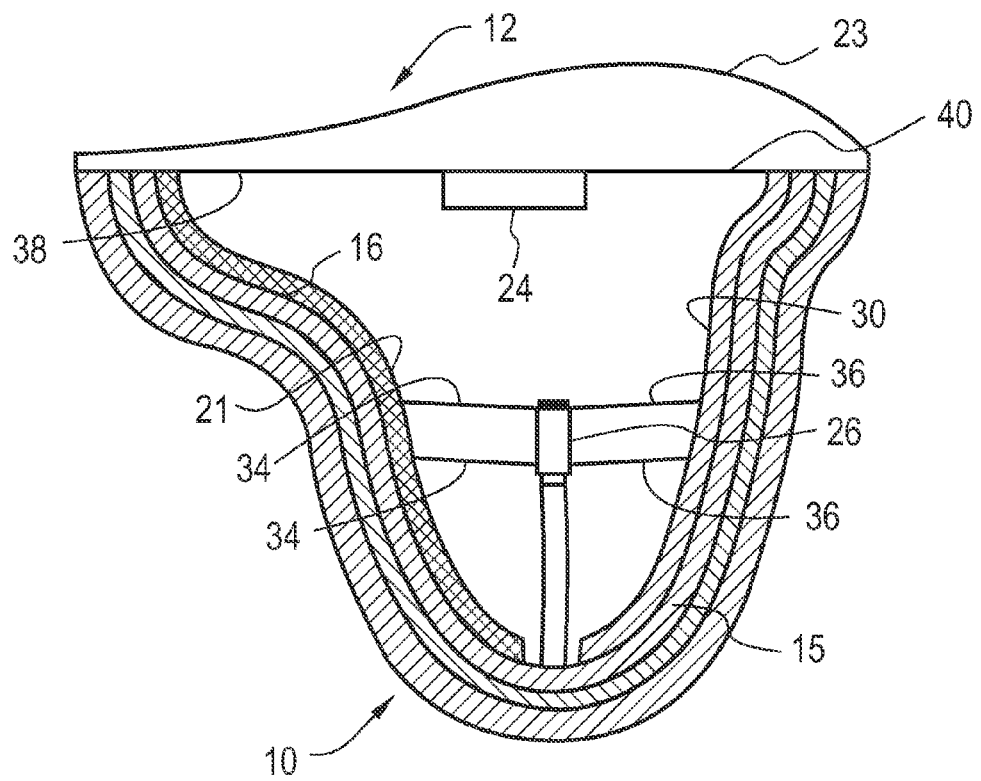
FIG. 7 illustrates connection of an electrical component to the additional conductive layers according to an embodiment herein.

Referring now to FIG. 7, an electrical component, for example a receiver 26 may be connected to the conductive layers 21, 30 using connector leads 34, 36. The receiver 24 illustrated in FIG. 7 is shown as an example and other electrical components may also be connected in a similar manner. Other connector means, such as soft rings and the like may also be used to connect an electrical component to the conductive layers 21, 30. The connector leads 34, 36 may pierce into the respective conductive layers 21, 30. The connector leads 34, 34 enable suspending the receiver 9 rigidly and thus, reduce shocks and vibrations encountered by the receiver due to the movement of the user of the hearing aid device. Additionally, the use of connector leads 34, 36 enable to eliminate the requirement of soldering and thus, make the manufacturing process easy and less time consuming.

In an embodiment, multiple connections from the conductive layers 21, 30 to the electrical component may be made to increase fault tolerance. For example, a plurality of connector leads 34, 36 may be used to make the connections between the conductive layers 21, 30 and the electrical component.

Figure 8:
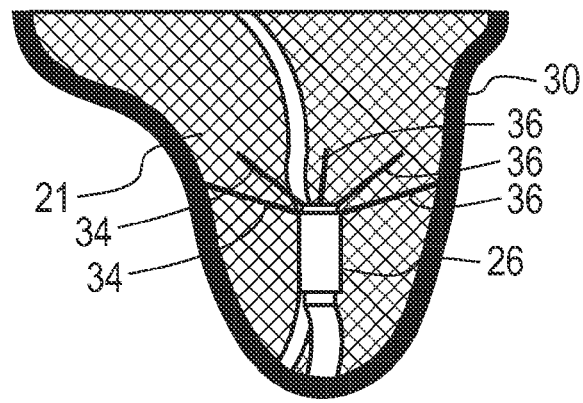
FIG. 8 illustrates connection between an electrical component and additional conductive layers attached onto an inner surface of a second non-conductive layer in more detail.

FIG. 8 illustrates connection between an electrical component and conductive layers attached onto the inner surface of the housing connector leads in more detail. In the shown example of FIG. 8, a receiver 26 is connected to the conductive layers 21, 30 using connector leads 34, 36. The connector leads 34, 36 may pierce into the conductive layers 21, 30. The connector leads 34, 36 connect to a connection pad and the connection pad in turn connects to the contact terminal of the receiver 26. In the shown example of FIG. 6, the receiver 26 is held in a suspended position rigidly and thus reduces the chances of device failure due to shock and vibration. The multiple connector leads 34, 36 enables in increasing fault tolerance of the hearing aid device 12 of FIG. 7.

Figure 9:
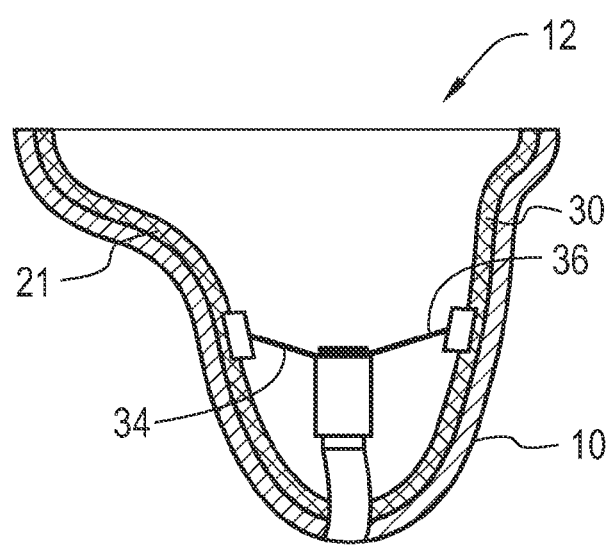
FIG. 9 illustrates connection between an electrical component and additional conductive layers using connection leads attached onto an inner surface of a second non-conductive layer according to an embodiment herein.

Referring again to FIG. 7, in an alternative implementation, the housing 10 may be manufactured such that connector leads 34, 36 are attached to the housing 10. The receiver 26 may be connected to the connector leads 34, 36 and thus connect to the additional conductive layers 21, 30. FIG. 9 illustrates connection between an electrical component and conductive layers using connection leads attached onto the inner surface of the housing. The receiver 26 is connected to the conductive layers 21, 30 using connector leads 34, 36. The connector leads 34, 36 are attached to the housing 10 of the hearing aid device 12 and are conductively connected to the conductive layers 21, 30. The connector leads 34, 36 may be attached to the housing 10 during fabrication of the housing 12.

Figure 10A:
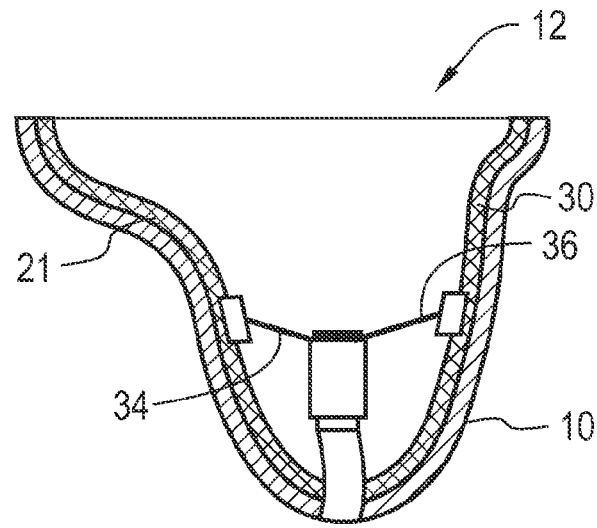
FIG. 10a illustrates connection between an electrical component and conductive layers attached onto an inner surface of a housing of a hearing aid device using soft rings.
Figure 10B:
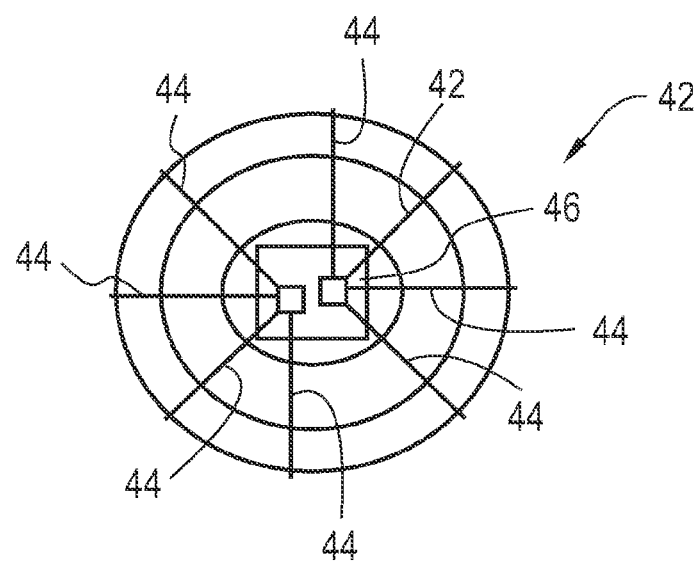
FIG. 10b illustrates a soft ring in detail.

Referring now to FIG. 7 and FIGS. 10a through 10b, in another implementation soft ring 42 may be used to connect the receiver 26 to the conductive layers 21, 30 and also to suspend the receiver 26 rigidly. FIG. 10a illustrates connection between an electrical component and conductive layers attached onto the inner surface of the housing of the hearing aid device using soft rings. In the shown example of FIG. 10a, a receiver 26 is connected to the additional conductive layers 21, 30 using soft rings 42. FIG. 10b illustrates a soft ring 42 in detail. The soft ring 42 comprises conductive medium 44 which are connected to the additional conductive layers 21, 30 of FIG. 10a. The conductive mediums 44 connect to a connection pad 46 on the soft ring 42 and the connection pad 44 connects to the contact terminal of the receiver 26 of FIG. 10a. The multiple conductive mediums 44 enable multiple connections between the receiver 26 and the conductive layers 21, 30. This increases the fault tolerance of the hearing aid device 12 as redundant connections may be made to an electrical component. In the shown example of FIG. 10a, the receiver 26 is held in a suspended position rigidly and thus reduces the chances of device failure due to shock and vibration.

Referring again to FIG. 7, another electrical component, for example, an amplifier 24 may be connected to the conductive layers 21, 30 using connector leads 38, 40. Soft rings 42 of FIG. 10a and FIG. 10b may also be used to connect the amplifier 24 to the conductive layers 21, 30. Thus, connecting the receiver 26 and the amplifier 24 to the conductive layers 21, 30 enable conductively connecting the receiver 26 to the amplifier 24 without the requirement of loose wire leads. Moreover, the connector leads 34, 36 hold the receiver 26 in a suspended position which is rigid and reduce shocks and vibrations encountered by the receiver 26 due to the movement of the user of the hearing aid device. Suspending the receiver 26 inside the housing 10 eliminates the need of extra caution to be taken while the hearing aid device is being manufactured. Alternatively, the manufacturing time for the hearing aid device 12 is reduced.

In an embodiment, a face plate 23 is provided at the distal end of the hearing aid device 12. Typically, the amplifier 24 is mounted onto the face plate 23. In an implementation, the face plate 22 and the amplifier 24 may also be printed using the solid freeform techniques.

Still referring to FIG. 7, preferably, the additional conductive layers 21, 30 are attached onto the inner surface 16 of the second non-conductive layer 15 by fabricating the housing 10 and the conductive layers 21, 30. While fabricating the housing 22, the conductive layers 21, 30 may be fabricated onto the inner surface 16 of the second non-conductive layer 15. In certain implementation additional non-conductive layers of the housing 10 may be fabricated onto the inner surface 16 to which the conductive layers 18, 30 are fabricated. Additional non-conductive layers of the housing 10 may be fabricated for fabricating multiple layers of additional conductive layers or for providing insulation as the housing 10 is manufactured using a non-conducting material.

Figure 11A:
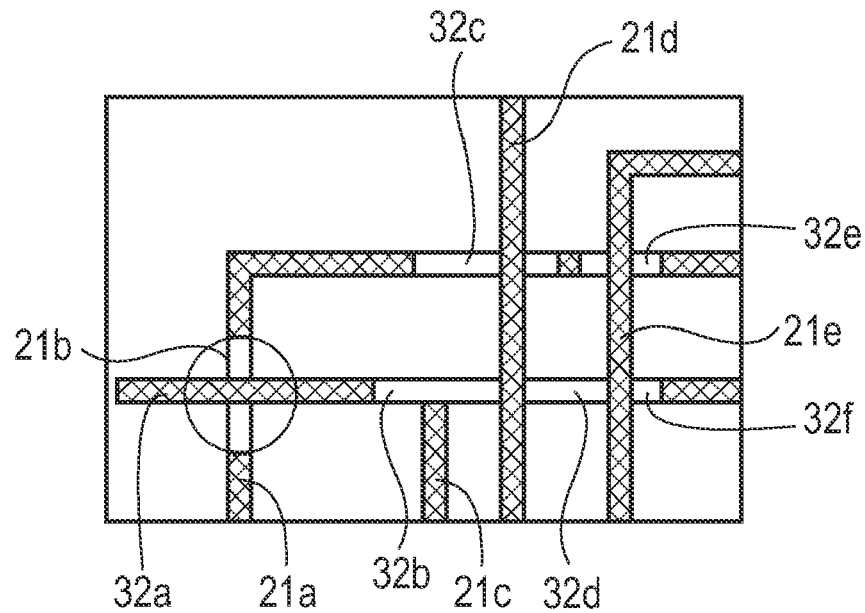
FIG. 11a illustrates separation of a plurality of conductive layers using insulating mediums in accordance to an embodiment herein.
Figure 11B:
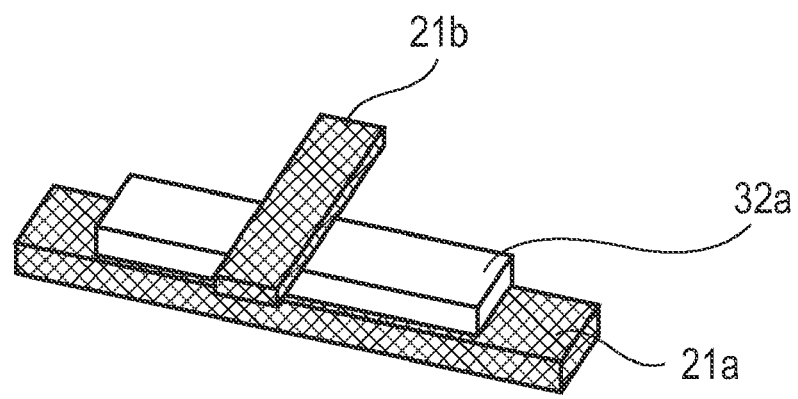
FIG. 11b is an enlarged side view of the encircled area of FIG. 11a, FIG. 12a illustrates connection between two electrical components using the additional conductive layers attached onto an inner surface of a second non-conductive layer of a housing of a hearing aid device and extended onto an outer surface of a casing of the electrical components, FIG. 12b additional conductive layers of FIG. 12a, FIG. 13 illustrates connection between an electrical component and an additional conductive layer using a casing of an electrical component.

Multiple additional conductive layers one above the other may also be provided. Advantageously, one additional conductive layer may be separated from another by an insulating medium. Alternatively an insulating layer may be attached onto the inner surface 16 of the second non-conductive layer 15 to separate two additional conductive layers. In an example, if the additional conductive layers are conductive pathways, the point of intersection of two additional conductive layers may be separated by having an insulating layer therein. FIG. 11a illustrates separation of a plurality of additional conductive layers using insulating mediums. A plurality of additional conductive layers 21a through 21e are separated from each other using insulating mediums 32a through 32f respectively. In the example of FIG. 11b, an enlarged side view of the encircled area of FIG. 11a is shown. It is seen that the additional conductive layers 21a and 21b are separated by the insulating medium 32a. The insulating medium 32a enables to prevent conduction between the additional conductive layers 21a and 21b. Thus, multiple additional conductive layers may be printed by having respective insulating mediums between them.

Referring now to FIG. 11a and FIG. 11b, in an implementation the conductive layers 21a through 21e may be filaments and the point of intersections can be separated by having insulating mediums 32a through 32f therein.

Figure 12A:
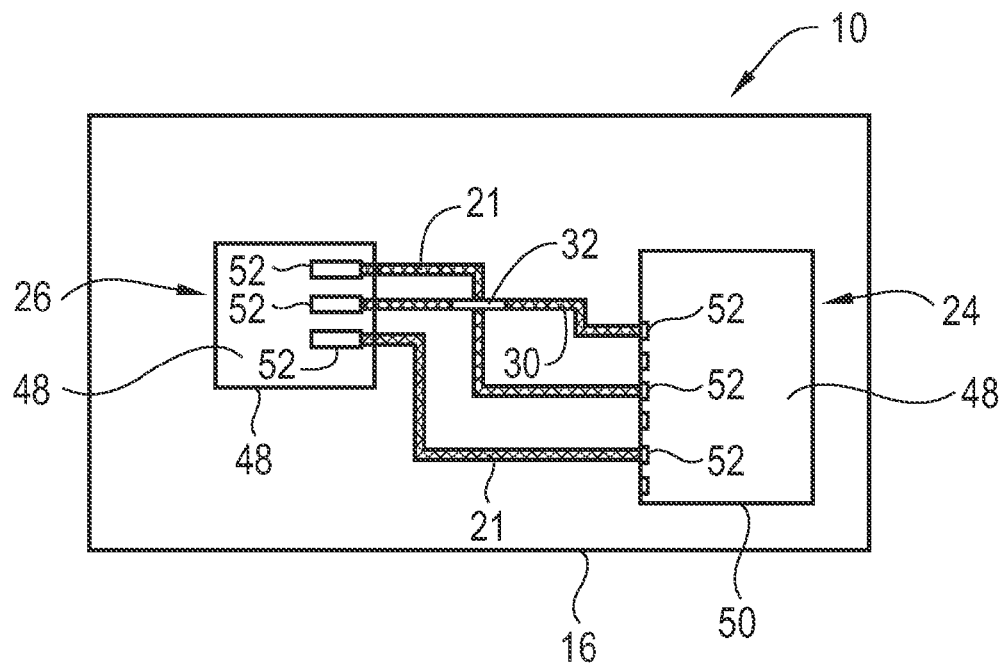

In another embodiment, the electrical components may be fixedly positioned onto the inner surface comprising the conductive layers. The conductive layers may be extended onto the outer surface of a casing of the electrical component and thus complete the connection. FIG. 12a illustrates connection between two electrical components using the additional conductive layers attached onto the inner surface of the second non-conductive layer of the housing of the hearing aid device and extended onto an the outer surface of the casing. In the shown example of FIG. 12a, electrical components, for example, a receiver 26 and an amplifier 24 may be held fixedly onto the inner surface 16 of the second non-conductive layer 15. The conductive layers 21, 30 may be printed onto the inner surface 16 of the second non-conductive layer 15 and onto the outer surface 48 of the casing 50 of the receiver 26 and the amplifier 24 to connect the receiver 26 and the amplifier 24. Alternatively, the additional conductive layers 21, 30 may be conductively connected to a single electrical component to provide power to the electrical component. The conductive layers 21, 30 printed onto the outer surface 48 of the casing 50 make contact with connection pads 52 to connect the receiver 26 to the conductive layers 21, 30. An insulating medium 32 may be provided between the conductive layers 21, 30 for separating the conductive layers 21, 30. Preferably, the insulating medium 32 is provided at the point of intersection of the conductive layers 21, 30. However, the insulating medium 32 may be provided over the entire surface also. Preferably, in the present embodiment, the conductive layers 21, 30 are conductive pathways printed onto the inner surface 16 of the second non-conductive layer 15 and the outer surface 48 of the casing 50 of the receiver 26.

Figure 12B:
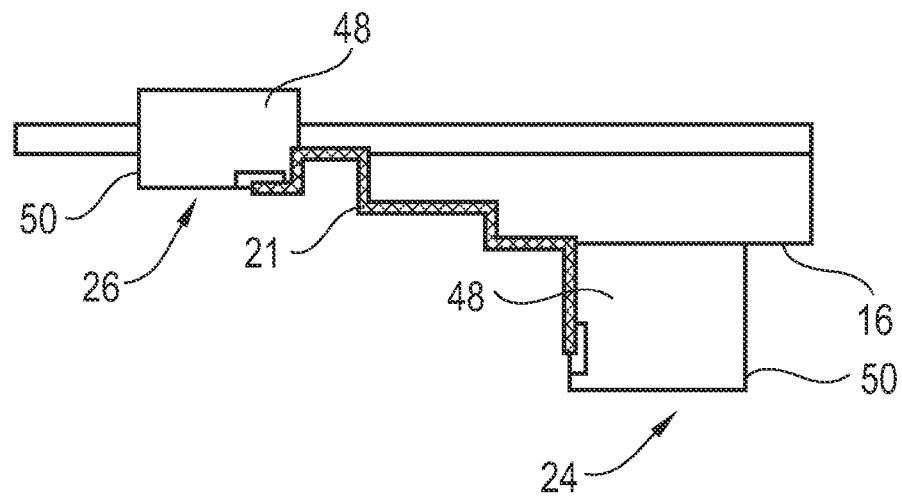

FIG. 12b illustrates a side view of the connection between the electrical components using the conductive layers of FIG. 12a. In the example of FIG. 12b, only the conductive layer 21 is illustrated for understanding purposes. It is seen that the conductive layer 21 is printed onto the inner surface 16 and over the outer surface 48 of the casing 50 of the amplifier 24 and the receiver 26. The present embodiment provides the advantage of connecting an electrical component to the conductive layers 21, 30 by printing the conductive layers 21, 30 on the outer surface 48 of the casing 50 of the electrical component.

Figure 13:
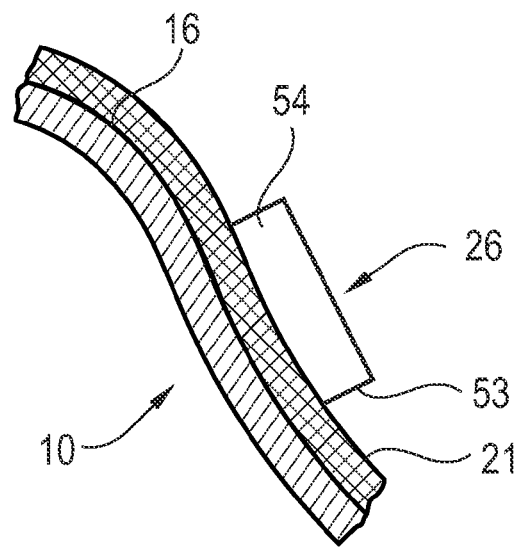

FIG. 13 illustrates connection between an electrical component and a conductive layer using a casing of the electrical component. Preferably, the conductive layer 21 extends over a substantial surface area of the inner surface 16 of the second non-conductive layer 15. However, the conductive layer 21 may extend over only a particular portion or region of the inner surface 16. In the present example, the conductive layer 21 may be adapted to operate either as a positive contact or a negative contact. The electrical component, for example the receiver 26 comprises a casing 53 having a conductive outer surface 54. The receiver 26 is fixedly positioned onto the conductive layer 21 attached onto the inner surface 16 such that the outer surface 54 of the casing 53 of the receiver 26 is in contact with the conductive layer 21. The receiver 26 is shown for the purposes of illustration only and other electrical components may also be positioned onto the conductive layer 21. Internally, the outer surface 54 of the casing 53 may be connected to a connection point so that the outer surface 54 of the casing 53 is connected to the internal circuitry of the electrical component, i.e., the receiver 26. In an alternative embodiment, the casing 53 may be made using a conductive material such that the outer surface 54 and an inner surface of the casing 53 are conductive. In an implementation, only a portion of the outer surface 54 of the casing 53 may be conductive. If only a portion of the outer surface 54 of the casing 53 is conductive, it may be required that the receiver 26 be positioned onto the conductive layer 21 such that the conductive portion of the outer surface 54 of the casing 53 in is contact with the conductive layer 21. Accordingly, the electrical component may be conductively connected to the conductive layer 21. Additionally, one electrical component may be conductively connected to another electrical component using the conductive layer 21.

For an example, the conductive layer 21 may be adapted to operate as a common ground and the outer surface 54 of the casing 53 may be connected to the conductive layer 21 to connect the electrical component to the ground. Alternatively, the conductive layer 21 may be adapted to operate as a positive contact and the outer surface 54 of the casing 53 may be connected to the conductive layer 21 to connect the electrical component to a positive contact.

Figure 14:
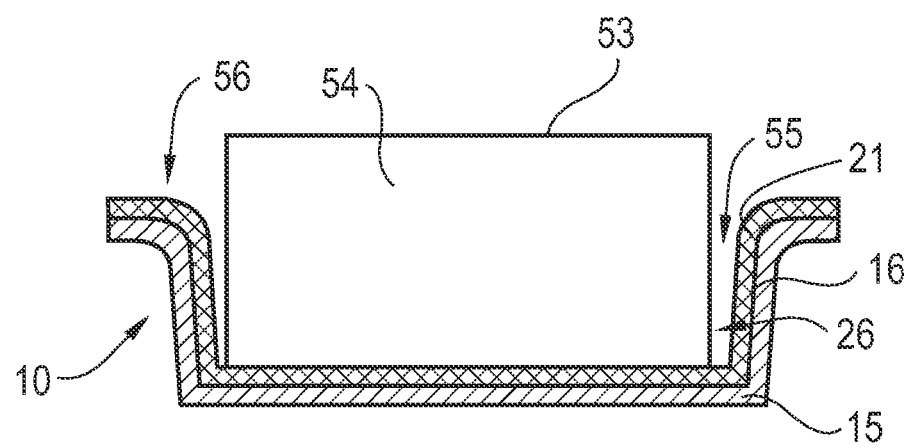
FIG. 14 illustrates a side view of a slot on an inner side of a housing of a hearing aid device according to an embodiment herein.

In an embodiment, the housing 22 may comprise a slot to receive an electrical component, for example the receiver 26. FIG. 14 illustrates a side view of a slot 55 on the inner side 56 of the housing 10. The slot 55 is provided on the inner side 56 of the housing 10. The electrical component when positioned into the slot 55 is conductively connected to the conductive layer 21. The conductive layer 21 may be attached onto a substantial area of the inner surface 16 of the second non-conductive layer 15, including the slot 55. Alternatively, the conductive layer 21 may be attached onto a portion of the inner surface 16 only within the slot 55.

This enables in reducing the requirement of loose wire leads and thus reduces the electromagnetic interference within the hearing aid device. Additionally, as there is no requirement of soldering, the manufacturing time is reduced and also there is possibility of miniaturizing the hearing aid device as the area covered by a soldering point is substantially large.

Figure 15:
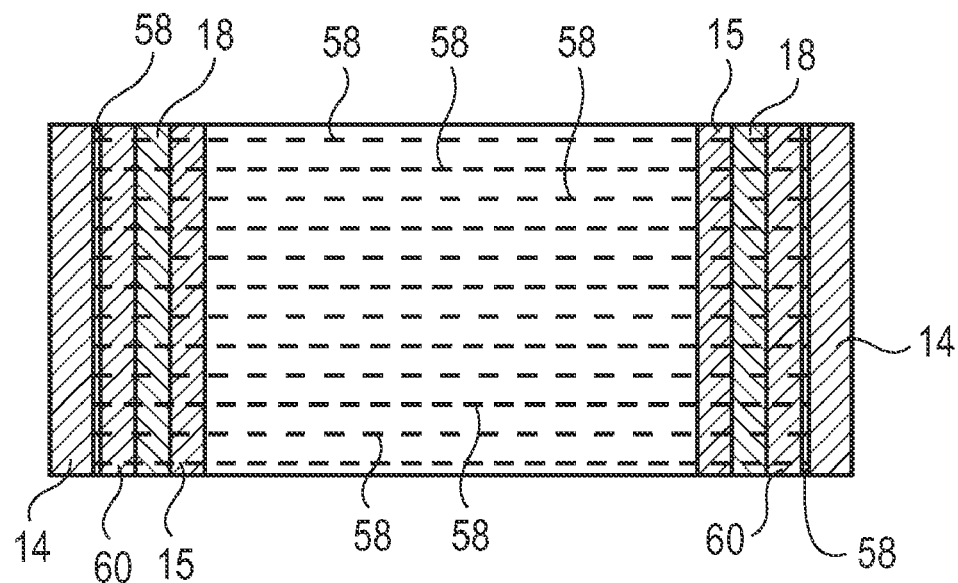
FIG. 15 is a cross sectional view of a housing of a hearing aid device illustrating a coil printed onto a layer of the hearing aid device between a first non-conductive layer and a conductive layer according to an embodiment herein.

FIG. 15 is a cross sectional view of the housing of the hearing aid device illustrating a coil provided on the first non-conductive layer. In the shown example of FIG. 15, a coil 58 is provided on the first non-conductive layer 14 of the housing 10. Typically, the coil 58 comprises a structure of a helix and spirals around the non-conductive layer 14 of the housing 10. The housing 10 may comprises an additional non-conductive layer 60 over the coil 58. The additional non-conductive layer 60 prevents the coil 58 from being damaged and also prevents inconvenience to the user of the hearing aid device 12 due to the presence of the coil 58.

The coil 58 may be used for wireless communication or for wireless charging of the hearing aid device 12. This enables efficient use of the inner space 20 of FIG. 1 of the hearing aid device 12, and thus, enables miniaturization of the hearing aid device 12. Additionally, as the coil 58 is provided external to the first conductive layer 18, the inner space 20 is shielded from any EMI arising out of the coil 58 by the first conductive layer 18.

Referring now to FIG. 1 through FIG. 15, the housing 10 of the hearing aid device 12 is manufactured by embedding the first conductive layer 18 between the first non-conductive layer 14 and the second non-conductive layer 15. Advantageously, the conductive layer 18 is embedded between the first non-conductive layer 14 and the second non-conductive layer 15 using a solid freeform fabrication technique. The solid freeform fabrication technique includes, but not limited to inkjet printing, pneumatic spraying, screen printing, pad printing, laser printing, dot matrix printing, thermal printing, lithography, and 3D printing. Solid freeform fabrication technique provides the advantages of enabling the manufacturing of the first conductive layer 18, the first non-conductive layer 14 and the second non-conductive layer 15 simultaneously such that the housing 22 comprises the first conductive layer 18 between the first non-conductive layer 14 and the second non-conductive layer 15. This decreases the manufacturing time of the hearing aid device 1 and also reduces the complexities. Moreover, using solid freeform fabrication technique to manufacture the housing 10 eliminates the requirement for having separate moulds for individual hearing aid device 12 design. However, the housing 10 may be manufactured using other manufacturing techniques such as MID and inset molding. If the hearing aid device is manufactured using a MID or an inset molding technique, a mould may be required to be created for each hearing aid device. Additionally, the manufacturing time of the hearing aid device 12 may be increased as the conductive layer 18, the first non-conductive layer 14 and the second non-conductive layer 15 will have to be manufactured one at a time.

In a preferred embodiment, the housing 10 is fabricated a 3D printing technology. Solid freeform fabrication techniques, such as the 3D printing technology enables fabricating a product using multiple materials. For example, a first printer head may print the first non-conductive layer 14 of the housing, a second printer head may print the conductive layer 18 and a third printer head may print the second non-conductive layer 15. The first printer head may be used to print the second non-conductive layer 15 as typically, the first conductive layer 14 and the second conductive layer 15 comprises the same non-conducting materials. The printing is done by fabricating layers one after the next successively in physical space until the model or the product is completed.

For example, the conductive layer 18, the first conductive layer 18, the first non-conductive layer 14 and the second non-conductive layer 15 may be printed by the respective printer heads by dispersion of suitable respective printing compositions. The printing composition for printing the non-conductive layers 14, 15 may comprise particles of non-conducting elements, for example a resin. The printing composition for printing the conductive layer 18 may comprise particles of conductive elements, such as copper, gold, silver, electrically conductive polymer, and the like. The respective printing compositions for printing the non-conductive layers 14, 15 and the conductive layer 18 may comprise nanoparticles of elements suitable for printing the respective layers. The conductive layer 21 may be printed onto the inner surface 16 of the second non-conductive layer 15 in a similar manner. Also the coil 58 and the additional non-conductive layer 60 may be printed in a similar manner.

Solid freeform fabrication techniques, such as the 3D printing technology enables fabricating a product using multiple materials. It will be apparent to a person skilled in the art that the layers of the housing 10 and the conductive layer 18 may be printed simultaneously using freeform fabrication techniques using the respective printing heads such that the end product is the housing 10 having the conductive layer 18 between the first non-conducive layer 14 and the second non-conductive layer 15.

Figure 16A:
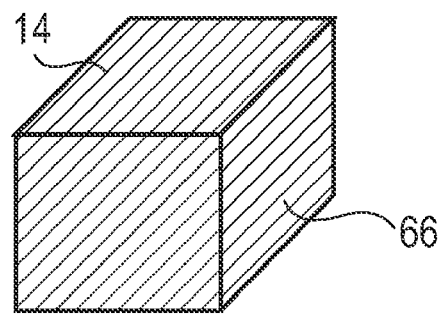
FIGS. 16a-16c illustrate a method of manufacturing a housing of a hearing aid device according to an embodiment herein.
Figure 16B:
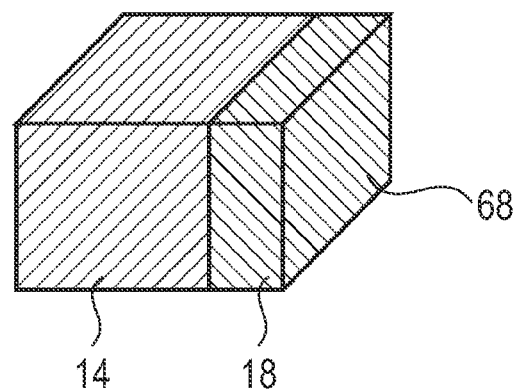
Figure 16C:
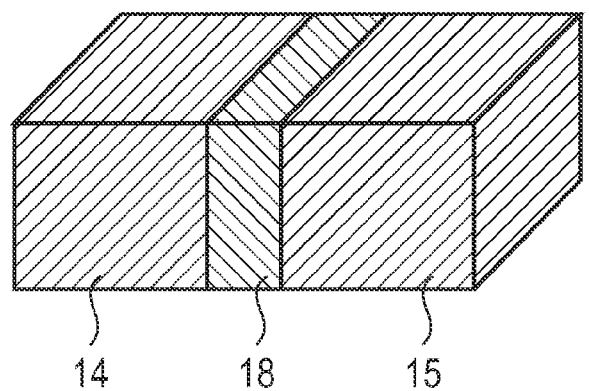

FIGS. 16a through 16c illustrate a method of manufacturing a housing of a hearing aid device according to an embodiment herein. Referring now to FIG. 16a a first non-conductive layer 14 of the housing 10 of FIG. 1 is printed. The first non-conductive layer 14 comprises an inner surface 66 and an outer surface. Next, as illustrated in FIG. 16b, a conductive layer 18 is printed onto the inner surface 66 of the first non-conductive layer 14. The conductive layer 18 comprises an inner surface 68. In FIG. 16c, a second non-conductive layer 15 is printed onto an inner surface 68 of FIG. 16b of the conductive layer 18. Thus the conductive layer 18 is positioned between the first non-conductive layer 14 and the second non-conductive layer 15.

Thus, the conductive layer 18 is embedded between the first non-conductive layer 14 and the second non-conductive layer 15 of the housing 10.

The embodiments described herein provide a shielding layer for shielding the inner space of the hearing aid device from EMI. The inner space of the hearing aid device accommodates electrical components essential for the hearing aid function. Moreover, this enables efficient use of the inner space of the housing and thus enables the design of the hearing aid device to me more compact. Additionally, the requirement of loose wire leads to connect electrical components of a hearing aid device may be eliminated. Moreover, the manufacturing time of the hearing aid device is reduced. Eliminating the need of loose wire leads also enables the electronic component to be inserted independently into the housing during manufacturing of the hearing aid device, and thus eliminating the extra caution required during manufacturing. Moreover, certain embodiments provide a means to suspend the receiver rigidly so that the possibility of the failure of the hearing aid device is reduced. Suspension of the receiver independently enables the receiver to be pushed into position and thus enable easy repairing of the hearing aid device. Additionally, the elimination of loose wire leads enable in reducing the electromagnetic interference within the hearing aid device. Militarization of the hearing aid device is also possible as the requirement of soldering is eliminated.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

LIST OF REFERENCE SIGNS

10 Housing
12 Hearing aid device
14 First non-conductive layer
15 Second non-conductive layer
16 Inner surface
18 Conductive layer
20 Inner space
21 30 Additional conductive layers
22 Microphone
23 Face plate
24 Amplifier
26 Receiver
28 Power source
32 Insulating medium
34 36 Connector leads
38 40 Connector leads
42 Soft ring
44 Conductive medium
46 Connection pad
48 Outer surface of the casing 50
50 Casing
52 Connection pad
53 Casing
54 Outer surface of the casing 53
55 Slot
56 Inner side
58 Coil
60 Third non-conductive layer 66 Inner surface of the first non-conductive layer 15
68 Inner surface of the conductive layer 18

The invention claimed is:

1. A hearing aid device, comprising: a housing comprising a first non-conductive layer and a second non-conductive layer; a first conductive layer for shielding of components from external electromagnetic interferences between the first non-conductive layer and the second non-conductive layer; a second conductive layer attached onto a portion of an inner surface of the second non-conductive layer; a third non-conductive layer arranged outwardly to the first non-conductive layer; and a coil for wireless communication or for wireless charging of the hearing aid between the third non-conductive layer and the first non-conductive layer,
wherein the second conductive layer is conductively connected to an electrical component.

2. The hearing aid device as claimed in claim 1, wherein the electrical component comprises a printed electrical component.

3. The hearing aid device as claimed in claim 1, wherein the first conductive layer and the second conductive layer are fabricated using a solid freeform fabrication technique selected from the group consisting of: an inkjet printing, a pneumatic spraying, a screen printing, a pad printing, a laser printing, a dot matrix printing, a thermal printing, a lithography, and a 3D printing.

4. The hearing aid device as claimed in claim 1, wherein the first conductive layer and the second conductive layer comprises an element selected from the group consisting of: a copper, a gold, a silver, and an electrically conductive polymer.

5. A method for manufacturing a hearing aid device, comprising: producing a housing of the hearing aid device comprising a first non-conductive layer and a second non-conductive layer; embedding a first conductive layer for shielding of components from external electromagnetic interferences between the first non-conductive layer and the second non-conductive layer; attaching a second conductive layer onto an inner surface of the second non-conductive layer; conductively connecting an electrical component to the second conductive layer; embedding a coil for wireless communication or for wireless charging of the hearing aid between the first non-conductive layer and a third non-conductive layer, wherein the third non-conductive layer is arranged outwardly to the first non-conductive layer.

6. The method as claimed in claim 5, wherein the first conductive layer is embedded between the first non-conductive layer and the second non-conductive layer by a solid freeform technique selected from the group consisting of: an inkjet printing, a pneumatic spraying, a screen printing, a pad printing, a laser printing, a dot matrix printing, a thermal printing, a lithography, and a 3D printing.

7. The method as claimed in claim 5, wherein the electrical component comprises a printed electrical component.

8. The method as claimed in claim 5, wherein the first conductive layer, the second conductive layer, and the coil comprises an element selected from the group consisting of: a copper, a gold, a silver, and an electrically conductive polymer.

* * * * *